United States Patent
Vossen

(10) Patent No.: US 8,250,270 B2
(45) Date of Patent: Aug. 21, 2012

(54) SYSTEM AND METHOD OF INCREASING DATA PROCESSING ON A DIAGNOSTIC TOOL

(75) Inventor: David Vossen, Kalamazoo, MI (US)

(73) Assignee: SPX Corporation, Charlotte, NC (US)

( * ) Notice: Subject to any disclaimer, the term of this patent is extended or adjusted under 35 U.S.C. 154(b) by 469 days.

(21) Appl. No.: 12/475,919

(22) Filed: Jun. 1, 2009

(65) Prior Publication Data

US 2009/0300257 A1   Dec. 3, 2009

(51) Int. Cl.
*G06F 13/00* (2006.01)
*G06F 19/00* (2011.01)

(52) U.S. Cl. .............................. 710/110; 701/29; 701/35

(58) Field of Classification Search ................ 710/52, 710/110, 106, 305; 701/29, 31, 35
See application file for complete search history.

(56) References Cited

U.S. PATENT DOCUMENTS

| | | | |
|---|---|---|---|
| 6,225,898 B1* | 5/2001 | Kamiya et al. ................ | 340/505 |
| 6,928,349 B1* | 8/2005 | Namaky et al. ................ | 701/33 |
| 7,191,258 B2* | 3/2007 | Jeong ............................. | 710/22 |
| 2004/0230356 A1* | 11/2004 | Namaky ......................... | 701/29 |
| 2006/0041349 A1* | 2/2006 | Chinnadurai et al. .......... | 701/35 |
| 2008/0004762 A1* | 1/2008 | Seashore et al. ................ | 701/29 |
| 2008/0133067 A1* | 6/2008 | DeMay ........................... | 701/1 |
| 2008/0269975 A1* | 10/2008 | Bertosa et al. ................. | 701/29 |

* cited by examiner

*Primary Examiner* — Glenn A Auve
(74) *Attorney, Agent, or Firm* — Baker & Hostetler LLP

(57) ABSTRACT

A method of processing J1850 requests using a scan tool having multiple processor systems is provided. The scan tool includes a first processor that processes data according to scan tool functions to assist with diagnosing and repairing a vehicle. A second processor receives data transmitted to the first processor and stores the data in a buffer. The second processor determines whether the data is complete to enable the first processor to make a determination regarding the data.

19 Claims, 3 Drawing Sheets

SYSTEM AND METHOD OF INCREASING DATA PROCESSING ON A DIAGNOSTIC TOOL

CROSS-REFERENCE TO RELATED APPLICATIONS

This application claims priority to provisional U.S. patent application entitled, "SYSTEM AND METHOD OF INCREASING DATA PROCESSING ON A DIAGNOSTIC TOOL," filed May 30, 2008, having a Ser. No. 61/057,653, now pending, the disclosure of which is hereby incorporated by reference, in its entirety.

FIELD OF THE INVENTION

The invention relates generally to an automotive scan tool. More particularly, the invention relates to an automotive scan tool having multiple processors.

BACKGROUND OF THE INVENTION

Modern vehicles typically have one or more diagnostic systems, generally having separate computer control modules to control various functions of the vehicle. Some examples include powertrain control module (PCM), engine control module (ECM), a transmission control module (TCM), Anti-locking brake system (ABS), and an air bag control module. The vehicle diagnostic systems often have self-diagnostic capability to detect and alert the driver of problems the vehicle may be encountering, provide data stream information containing vehicle operating conditions, and allow a technician to perform special diagnostic functions to aide in vehicle repair. When a problem is found, a diagnostic trouble code (DTC) is set within a memory of a computer provided in the vehicle. DTCs are as general or as specific as the manufacturer desires.

To facilitate vehicle communications, an auto repair technician needs a diagnostic tool. The diagnostic tool must, therefore, be connected to the vehicle's computer bus system to access and retrieve vehicle data. Scan tools are testing devices that interface with vehicle diagnostic systems to retrieve information from the various control modules. The scan tools are equipped to communicate in various communication protocols such as Controller Area Network (CAN), J1850 VPM and PWM, ISO 9141, Keyword 2000 and others. These communications protocols may be specific to the various automobile manufacturers. The scan tool helps a technician diagnose and repair the vehicle based on information the tool retrieves from the vehicle.

Scan tools may include hardware for implementing a Byte Data Link Controller (BDLC) or software for simulating such hardware. This hardware can only transmit and receive individual bytes of data, similar to a Universal Asynchronous Receiver Transmitter (UART). Every time a byte of data is received or transmitted, an interrupt signal also occurs to indicate that the BLDC is ready to send the next byte or a byte is available to be received. Therefore, all messages on a bus of the hardware are handled byte-by-byte by a processor of the scan tool. Each interrupt suspends data processing until a determination is made whether the byte of data received is, for example, the start of a new data packet, data in the packet or the end of a packet. If the byte is the end of a packet, a determination is made regarding whether the packet is for the receiving processor or another processor on the bus. Thus, the processor must handle all bus traffic, whether or not it is intended for it. These interrupts delay processing and cause a lot of processor processing capability to be used for undesired data processing.

SUMMARY OF THE INVENTION

The foregoing disadvantages are overcome, to a great extent, by the invention, wherein in one aspect an apparatus is provided that in some embodiments includes a method of processing J1850 requests using a scan tool having multiple processors.

In accordance with one embodiment of the invention, a method of processing J1850 requests using a scan tool having multiple processor systems is provided. The scan tool includes a first (master) processor that processes data according to scan tool functions to assist with diagnosing and repairing a vehicle. A second (slave) processor receives data communicated from the first (master) processor, stores the data in a shared buffer, and indicates that a message is ready for transmission. The second (slave) processor may perform all functions typically performed by the BLDC as well as additional functions. For example, the second (slave) processor may perform bus arbitration, transmit a data packet on the bus when permitted to do so, monitor bus traffic, receive all packets on the bus, and selects, through, for example, a configurable software filter, only those messages destined for the first (master) processor.

In accordance with another embodiment of the invention, a method of processing J1850 requests using a scan tool having multiple processor systems includes using filters to determine whether data received by a secondary processor needs to be processed by a main processor. The filters determine whether data is related to functions being performed or to be performed by the scan tool. If data is not related to such functions, the data is not communicated to the main processor for processing. If a data packet is received that passes the filter criteria, the second (slave) processor stores the data in a shared buffer and signals the first (master) processor that data is ready. The first (master) processor can then retrieve the data in a single operation. This increases processor bandwidth and reduces processing time.

In accordance with another embodiment of the invention, a method of processing J1850 requests using a scan tool having multiple processor systems includes enabling a second processor to perform bus arbitration. The second processor determines when the bus is idle so that a particular device may use the bus with no intervention from a first processor. The second processor may also transmit automatic re-tries relating to loss of bus priority.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION OF THE INVENTION

Figure 1:
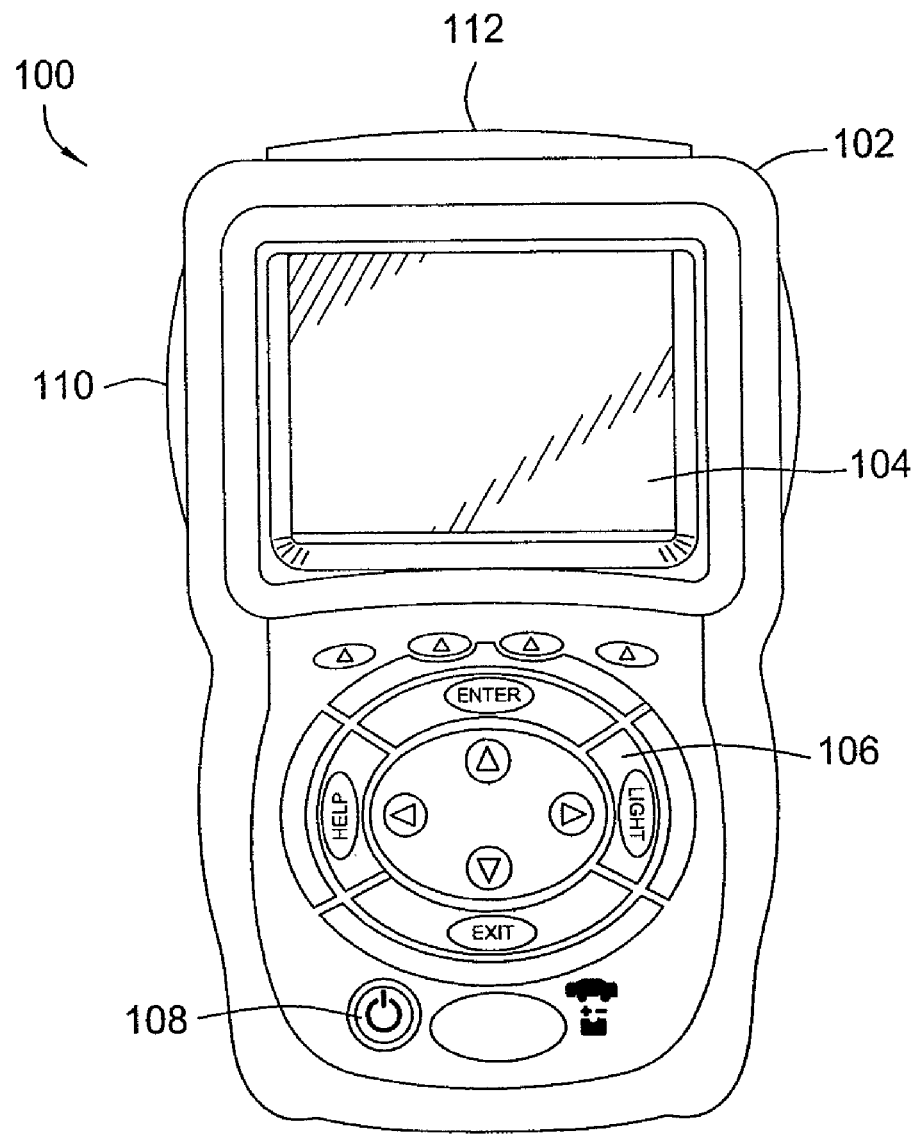
FIG. 1 is a front view illustrating a scan tool according to one embodiment of the invention.

The invention will now be described with reference to the drawing figures, in which like reference numerals refer to like parts throughout. An embodiment in accordance with the invention provides for an apparatus and method for better vehicle data processing.

"Scan tool" as used herein can be any computing device that includes a processor or controller. For example, a desktop computer, a notebook, personal digital assistant (PDA), a phone, or any other computing device.

FIG. 1 is a front view illustrating a scan tool 100 according to an embodiment of the invention. The scan tool can be any computing device, such as, for example, the Nemisys scan tool from Service Solutions (a unit of the SPX Corporation) in Owatonna, Minn. The scan tool can be used on all types of vehicles including a automobile, trucks, motorcycles, motor boats, etc. The scan tool 100 includes a housing 102 to house the various components of the scan tool, such as a screen 104, a user interface 106, a power key 108, a memory card reader 110 and a connector interface 112. The screen 104 can be any screen, for example, LCD (liquid crystal display), VGA (video graphics array), touch screen (can also be a user interface), etc. The user interface 106 allows the user to interact with the scan tool in order to operate the scan tool as desired. The user interface 106 can include function keys, arrow keys or any other type of keys that can manipulate the scan tool 100 in order to operate functionality of the scan tool. The user interface can also include numbers or be alphanumeric. The power key 108 allows the user to turn the scan tool on and off, as required.

Memory card reader 110 can be a single type card reader, such as a compact flash card, floppy disc, memory stick, secure digital, flash memory or other types of memory. The memory card reader 110 can be a reader that reads more than one of the aforementioned memory such as a combination memory card reader. Additionally, the card reader 110 can also read any other computer readable medium, such as CD, DVD, UMD, etc.

The connector interface 112 allows the scan tool 100 to connect to an external device, such as an ECU (electronic control unit) of a vehicle, a computing device, an external communication device (such as a modem), a network, etc. through a wired or wireless connection. Interface 112 can also include a USB, FIREWIRE, modem, RS232, RS485, and other connections to communicate with external devices, such as a hard drive, USB drive, CD player, DVD player, UMD player or other computer readable medium devices.

Figure 2:
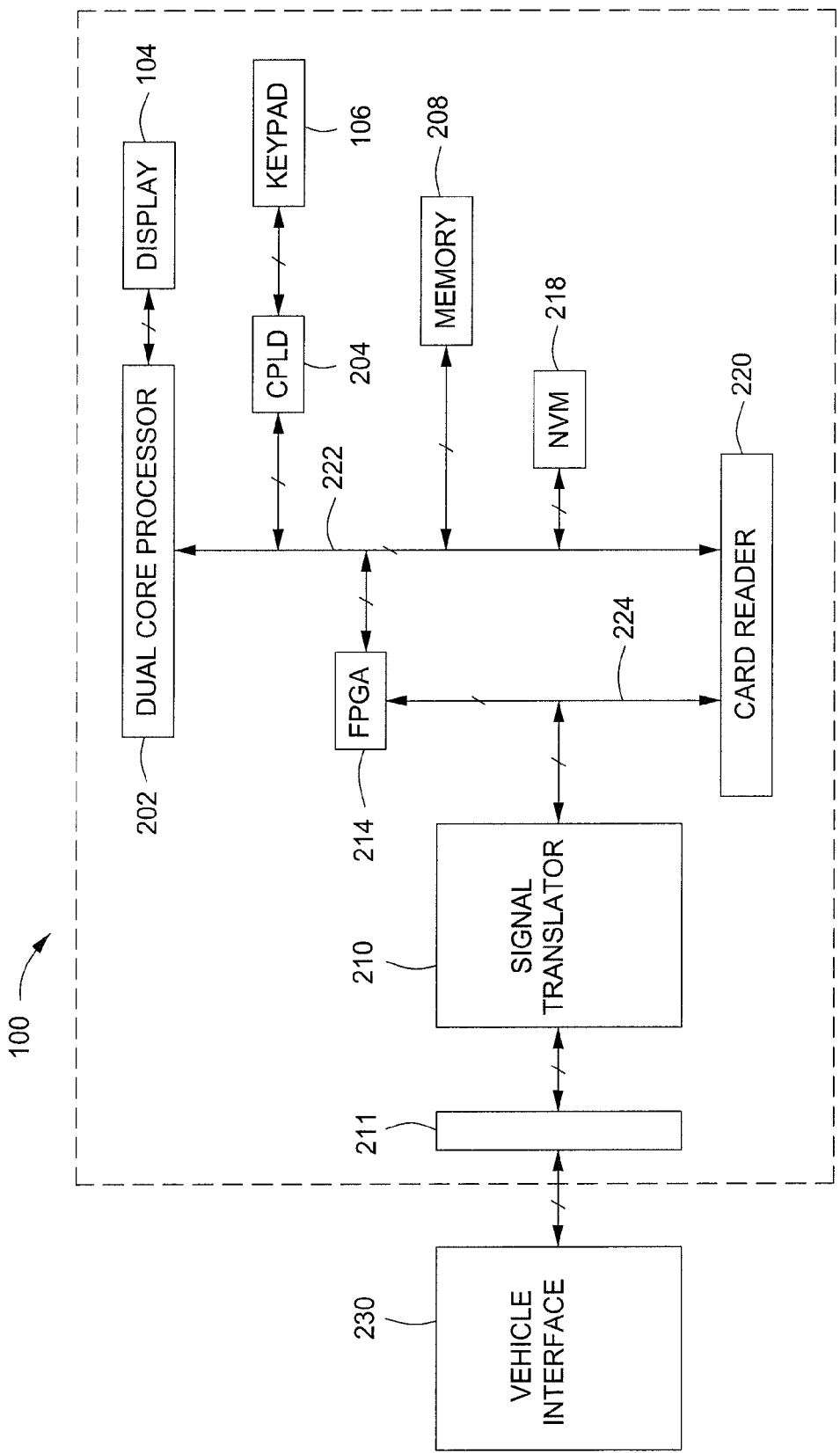
FIG. 2 is a block diagram of the components of a diagnostic tool.

FIG. 2 is a block diagram of the components of a diagnostic tool 100. In FIG. 2, the diagnostic tool 100 according to an embodiment of the invention includes a processor 202, a field programmable gate array (FPGA) 214, a system bus 224, the display 104, a complex programmable logic device (CPLD) 204, the user interface 106 in the form of a keypad, a memory subsystem 208, an internal non-volatile memory 218, a card reader 220, a system bus 222, the connector interface in the form of a data link connector 211, and a selectable signal translator 210. The data link connector 211 can connect to a vehicle interface 232 via an external cable (not shown).

Selectable signal translator 210 communicates with the vehicle communication interface 230 through the data link connector 211. Signal translator 210 conditions signals received from a motor vehicle control unit through the vehicle communication interface 230 to a conditioned signal compatible with diagnostic tool 100. Translator 210 can communicate with, for example, the following communication protocol: J1850 signal, ISO 9141-2 signal, communication collision detection (CCD) (e.g., Chrysler collision detection), data communication links (DCL), serial communication interface (SCI), S/F codes, a solenoid drive, J1708, RS232, controller area network (CAN), or other communication protocols that are implemented in a vehicle.

The circuitry to translate a particular communication protocol can be selected by FPGA 214 (e.g., by tri-stating unused transceivers) or by providing a keying device that plugs into the connector interface 112 that is provided by diagnostic tool 100 to connect diagnostic tool 100 to vehicle communication interface 230. Translator 210 is also coupled to FPGA 214 and the card reader 220 via bus 224. FPGA 214 transmits to and receives signals (i.e., messages) from the motor vehicle control unit through translator 210.

FPGA 214 is coupled to processor 202 through various address, data and control lines by the system bus 222. FPGA 214 is also coupled to the card reader 220 through bus 224. Processor 202 is also coupled to the display 104 in order to output the desired information to the user. The processor 202 communicates with the CPLD 204 through system bus 222.

In one embodiment, the processor can be a dual processor such as an S12XE, S12XF, S12XHZ and other similar processor from Freescale Semiconductor (Austin, Tex.). However, any processor having at least dual cores is included in the embodiment.

Additionally, processor 202 is programmed to receive input from the user through the keypad 106 via the CPLD 204. The input device 106 can also be a mouse or any other suitable input device. The CPLD 204 provides logic for decoding various inputs from the user of diagnostic tool 100 and also provides glue-logic for various other interfacing tasks.

Memory subsystem 208 and internal non-volatile memory 218 are coupled to system bus 222, which allows for communication with the processor 202 and FPGA 214. Memory subsystem 208 can include an application dependent amount of dynamic random access memory (DRAM), a hard drive, and/or read only memory (ROM). Software to run the scan tool 100 can be stored in the memory subsystem 208. Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 114, memory 218 can contain downloadable images so that FPGA can be reconfigured for a different group of communication protocols.

Figure 3:
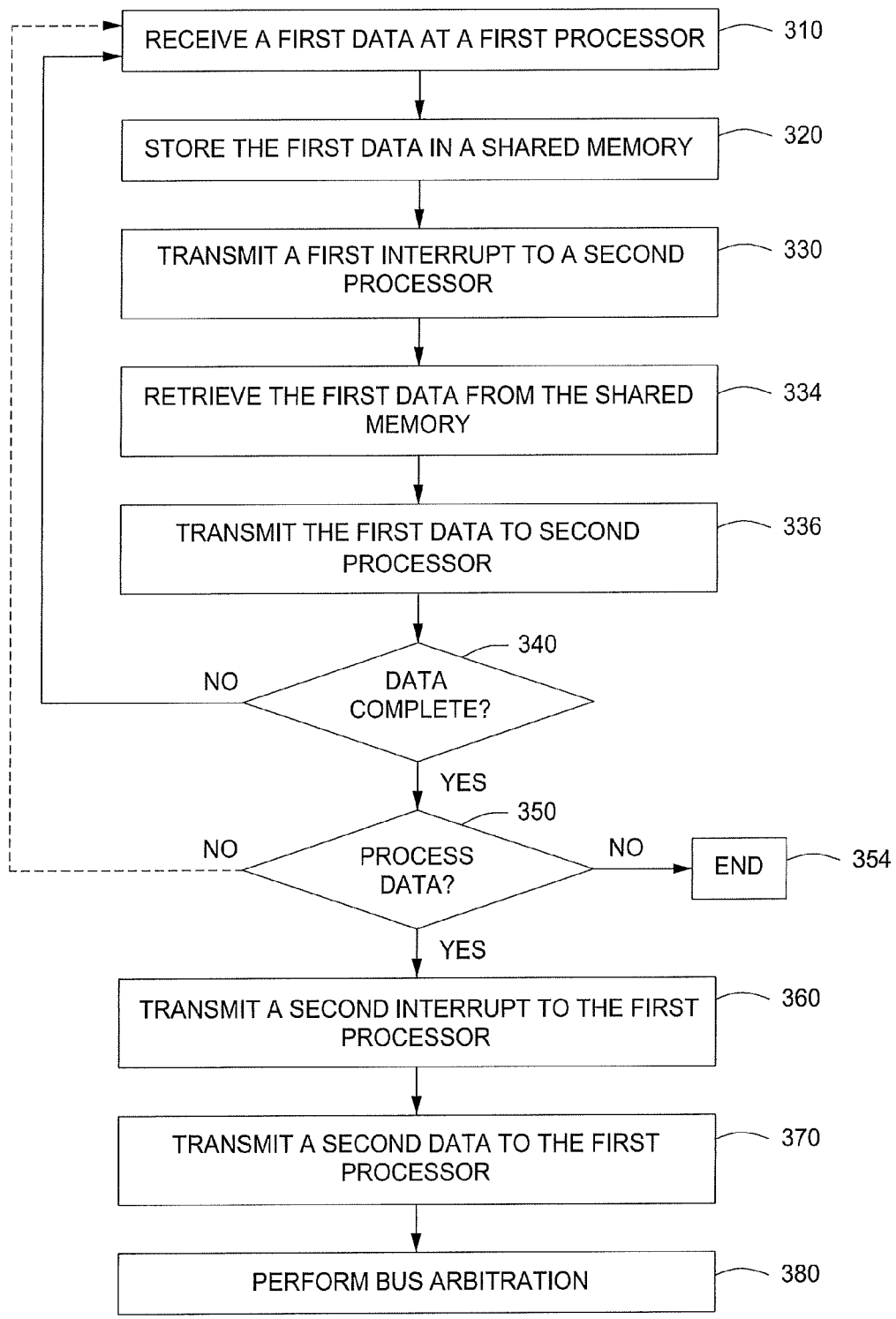
FIG. 3 illustrates a method according to one embodiment of the invention.

FIG. 3 illustrates a method 300 of increasing data processing on a scan tool according to one embodiment of the invention. In operation, at step 310, data is received by a first processor. The data may be a user selecting on the scan tool that certain diagnostic data is needed from a vehicle such as rotation per minute or what DTCs (diagnostic trouble code) have been set in the vehicle. At step 320, the first processor stores the data in a buffer. At step 330, the first processor transmits an interrupt to a second processor. The interrupt indicates that data has been received and needs to be evaluated. At step 334, the second processor retrieves the first data from the shared memory. At step 336, transmit the first data to the second processor. At step 340, the second processor determines whether the data received is complete. This step is performed because data is received and transmitted by the scan tool in individual bytes. Therefore, the scan tool is unable to perform a function until all necessary bytes of data have been received.

If a determination is made, at step 340, that the data is not complete, the method 300 may return to step 310 to receive additional data. If the second processor determines that all bytes of data for a particular function have been received and the data is complete, the second processor, at step 350, determines whether the data should be processed. According to one embodiment of the invention, one or more software settable filters may be used to assist in determining whether data should be processed. For example, one or more filters may be created to identify data related to one or more particular functions. If one or more of those functions have not been requested to be performed by a scan tool user or if the data is not necessary to perform a function requested by the scan tool user, the filters may not transmit the data to the first processor for processing.

If a determination is made, at step 350, that the data should not be processed, the method 300 may return to step 310 to receive additional data or end at step 354. If a determination is made that the data needs to be processed, the second processor may transmit an interrupt to the first processor in step 360. The interrupt indicates to the first processor that data processing is required. The second processor may then transmit the data to the first processor in step 370. In this manner, the first processor is prevented from receiving unnecessary interrupts and processing unnecessary data. This increases the bandwidth of the first processor, reduces processing time, and enables the first processor to perform tasks required of functions desired to be performed and requested by a scan tool user.

According to one embodiment of the invention, in step 380, the second processor may also perform a portion or all bus arbitration. Bus arbitration grants use of a system bus to a particular device. By enabling the second processor to perform bus arbitration, the first processor again is further enabled to perform tasks required of functions desired to be performed and requested by a scan tool user. The second processor may also be enabled to provide for automatic re-tries regarding the loss of bus priority. According to one embodiment of the invention, bus arbitration is performed solely by the second processor with no intervention necessary from the first processor.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of data processing in a scan tool, the steps comprising:
   receiving data at a first processor;
   transmitting a first interrupt from the first processor to a second processor;
   storing the data in a buffer;
   determining whether the data is complete;
   transmitting the data to the second processor; and
   determining whether the data should be processed by the first processor.

2. The method of claim 1 further comprising performing bus arbitration.

3. The method of claim 2, wherein the second processor performs the bus arbitration.

4. The method of claim 2, further comprising performing automatic re-tries on a loss of bus priority.

5. The method of claim 1 further comprising applying at least one filter to the data.

6. The method of claim 1 further comprising sending a second interrupt from the second processor to the first processor if the first processor is to process the data.

7. The method of claim 6 further comprising transmitting the data from the second processor to the first processor so that the first processor processes the data.

8. A diagnostic tool, comprising:
   a first processor configured to processes data received from a vehicle, wherein the first processor is further configured to send a first interrupt to a second processor;
   a memory configured to store diagnostic software to process the data and configured to store the data;
   a signal translator configured to communicate with the vehicle in a communication protocol;
   a bus configured to carry data between the first processor and the second processor; and
   a display configured to display the processed data, wherein the second processor determines if the data is complete and if complete, whether the data should be processed by the first processor.

9. The tool of claim 8, wherein the second processor performs a bus arbitration.

10. The tool of claim 9, wherein the second processor automatically re-tries on a loss of bus priority.

11. The tool of claim 8, wherein the software includes at least one filter configured to filter the data.

12. The tool of claim 8, wherein a second interrupt is sent from the second processor to the first processor if the first processor is to process the data.

13. The tool of claim 8 further comprising an input device configured to input information into the diagnostic tool.

14. A diagnostic tool, comprising:
   first means for processing data received from a vehicle, wherein the first means for processing is further configured to send a first interrupt to second means for processing;
   means for storing diagnostic software to process the data, wherein the means for storing also stores the data;
   means for communicating with the vehicle in a communication protocol;
   means for transferring data between the first means for processing and the second means for processing; and
   means for displaying the processed data, wherein the second means for processing determines if the data is complete and if complete, whether the data should be processed by the first means for processing.

15. The tool of claim 14, wherein the second means for processing performs a bus arbitration.

16. The tool of claim 15, wherein the second means for processing automatically re-tries on a loss of bus priority.

17. The tool of claim 14, wherein the software includes at least one filter configured to filter the data.

18. The tool of claim 14, wherein a second interrupt is sent from the second means for processing to the first means for processing if the first means for processing is to process the data.

19. The tool of claim 14 further comprising means for inputting information into the diagnostic tool.

* * * * *